INVENTOR.
KAM LI
BY John V. Regan
ATTORNEY

INVENTOR.
KAM LI
BY John V. Regan
ATTORNEY

United States Patent Office 3,105,957

Patented Oct. 1, 1963

3,105,957

NEGATIVE RESISTANCE DIODE MEMORY

Kam Li, Levittown, Pa., assignor to Radio Corporation of America, a corporation of Delaware Filed Oct. 2, 1959, Ser. No. 844,040
5 Claims. (Cl. 340—173)

The present invention relates to memory circuits employing negative resistance diodes. In particular, the invention resides in a novel circuit for ascertaining the diode state, that is, whether the diode is operating in the low or high voltage stable regions of its operating range.

According to the invention, read signals at frequencies $f_1$ and $f_2$ are applied to the diode, whereby a beat frequency is produced which is in one of two distinct phases. One of the phases has been discovered to correspond to one state of the diode and the other to the other state of the diode. Neither tuned circuits nor any other inductive elements are required across the diode so that the speed of the read-out can approximate the ultimate switching speed of the diode. The read-out is non-destructive, that is, the stable region in which the diode is operating is not changed due to the application of the read signals.

The invention will be described in greater detail by reference to the following description taken in connection with the accompanying drawing in which.

Figures 1, 2, 3:
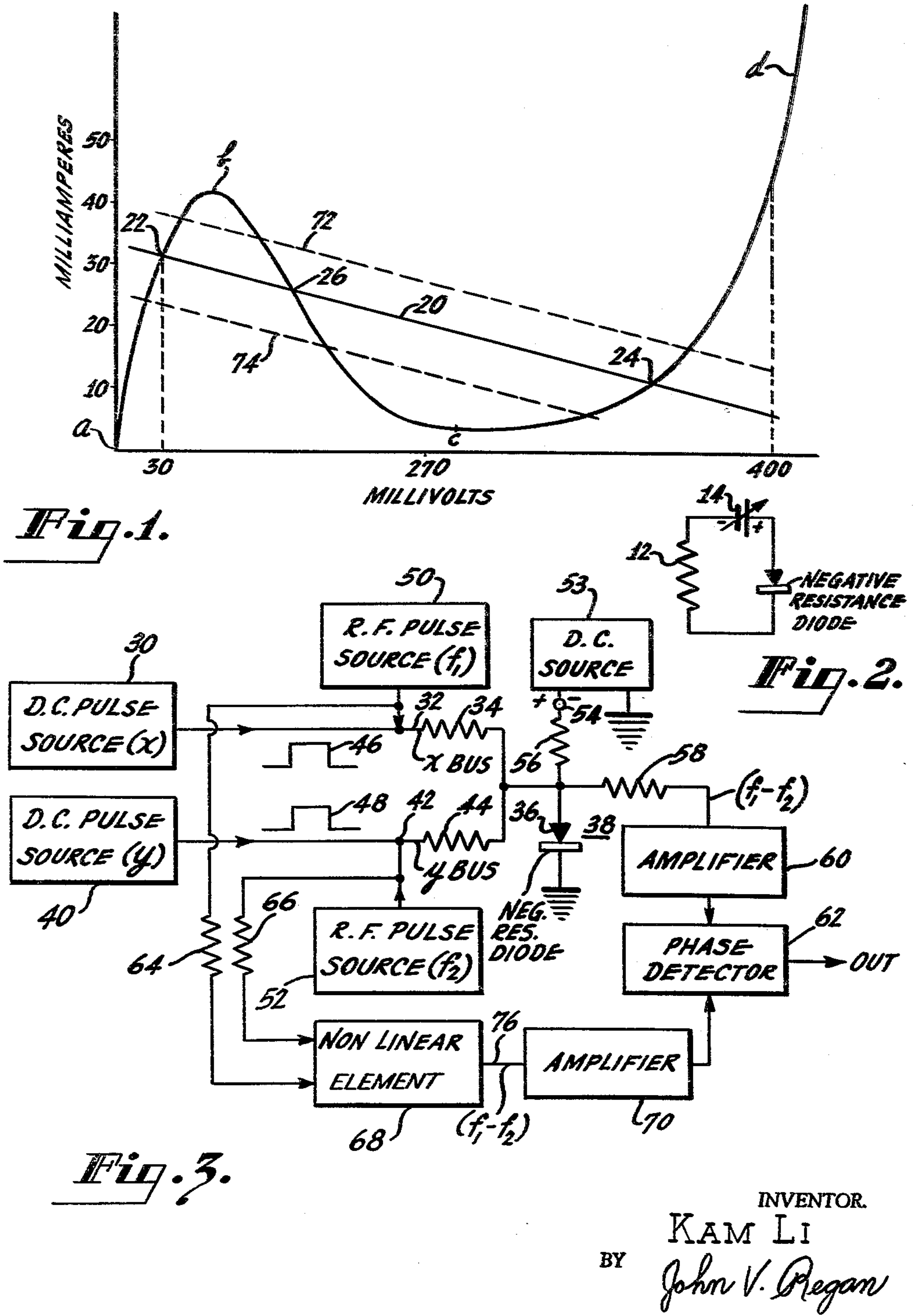
FIG. 1 is a curve which is useful in explaining the operation of the circuit of the invention.
FIG. 2 is a highly simplified circuit from which the curve of FIG. 1 may be derived.
FIG. 3 is a block and schematic circuit diagram of one form of the present invention.

A characteristic curve of current versus voltage for a negative resistance diode is shown in FIG. 1. The values of millivolts and milliamperes given are by way of example and are not meant to be limiting. The milliampere range, for example, may differ substantially for different diodes. The portions *ab* and *cd* of the volt-ampere (E-I) characteristic are regions of positive resistance (the inverse of the slope, $dE/dI$, which is equal to resistance R, is a positive quantity). The portion *bc* of the volt-ampere characteristic is a region of negative resistance (the inverse of the slope of the portion *bc* is negative).

A circuit for ascertaining the characteristic curve for a negative resistance diode 10 is shown in FIG. 2. It may include, in series, a diode 10, a load resistor 12 having a resistance at least 10 times the diode resistance, and a source of voltage 14 for forward biasing the diode. The value of resistor 12 may include the internal resistance of the source 14. The source and load resistor together, because of the resistance value, act somewhat like a constant current source and load line 20 has the slope indicated. If the source were a perfect constant current source, load line 20 would be parallel to the millivolt axis.

Load line 20 intersects the positive resistance region *ab* of the characteristic at 22 and the positive resistance region *cd* of the characteristic at 24. It also intersects the negative resistance region *bc* of the diode at 26. The points 22 and 24 are stable operating points and the point 26 is an unstable operating point. Assume that initially the voltage across the diode is of the order of 30 millivolts or so. The current through the diode is about 30 milliamperes and the diode is at a stable low voltage state represented by the point 22. When the current through the diode is increased in the forward direction, for example by changing the source voltage, the load line is shifted on the characteristic until the load line passes through point *b*. The latter point represents a current of about 43 milliamperes. Increasing the forward current to a value greater than this drives the load line in the upward direction beyond the point *b*. It is believed that the diode is thereby driven into its negative resistance region but, since the latter represents an unstable condition of the diode, the diode cannot remain there and rapidly switches to its second stable state—the intersection of the shifted load line and positive resistance region *cd*.

If, after the diode is switched, the current returns to the value indicated by the intersection of the load line 20 and the curve, the voltage reduces to a lower value as indicated by point 24. The point 24 or some other stable intersection point of a suitable load line and the positive slope region *cd* of the characteristic is hereafter termed the high voltage state of the diode and the point 22 or some other stable intersection point of the suitable load line and the positive portion *ab* of the characteristic is hereafter termed the low voltage state of the diode. In computer applications, one of the stable diode states may represent storage of the binary digit one, and the other, storage of the binary digit zero.

In a practical circuit the diode may be switched from one stable state to another by very short current pulses—as short as 0.1–2 millimicroseconds in duration, which, in effect, add or subtract from the supply voltage. A current pulse in a direction to increase the forward current of the diode, can switch the diode from its low to its high state as already described, and a current pulse in a direction to decrease the forward diode current, can switch the diode from its high to its low state in an analogous manner, that is, by shifting the load line intersection from 24 to a point beyond *c*.

An interesting aspect of the characteristic which is made use of in the present invention is its non-linearity in the positive resistance regions *ab* and *cd*. The non-linearity in the region *ab* is concave in one sense and the non-linearity in the region *cd* is concave in the opposite sense. More details of how this aspect is made use of are given later.

Discussion of some of the above and other aspects of negative resistance diodes may be found in an article by H. S. Sommers, Jr., appearing in the Proceedings of the IRE, July 1959, page 1201.

FIG. 3 illustrates a memory circuit according to the present invention. A direct-current (D.C.) pulse source 30 is connected via a lead 32 and through a resistor 34 to the anode 36 of a negative resistance diode 38. A second direct-current pulse source 40 is connected via a lead 42 and through a resistor 44 also to the anode 36 of the diode 38. Direct-current pulse sources 30 and 40 are each capable of applying either positive going (forward bias) or negative going (reverse bias) direct-current pulses to the diode. However, in the drawing only positive pulses 46 and 48 are shown. Capacitors or diodes may be used as coupling elements instead of resistors 34 and 44, if desired. The lead 32 carries information designated *x* information and may therefore be thought of as an *x* bus, and the lead 42 carries information designated *y* information and may therefore be thought of as a *y* bus. This portion of the system is for writing information into the diode.

A radio-frequency (R.F.) pulse source 52 is connected to *x* bus 32 and a second radio-frequency pulse source 52 is connected to $y$ bus 42. Sources 30, 40, 50 and 52 are isolated, as by having sufficiently high internal impedances, so that the radio-frequency outputs from sources 50 and 52 do not affect the direct-current pulse sources 30 and 40 and vice versa.

The steady state operating current for the diode is applied from a D.C. source 53 connected to terminal 54 and through resistor 56 to the anode 36. The anode is connected through a coupling resistor 58 to an amplifier 60. The latter is connected to one input of a phase detector 62.

R.F. pulse sources 50 and 52 are connected through resistors 64 and 66 to a non-linear element 68. The latter preferably is capable of very high speed operation and may be a negative resistance diode, a conventional diode, or other suitable element. If a negative resistance diode, it should be steady state biased to a value such that coincident current write pulses will not switch the diode or, alternatively, the diode can be one having a higher peak value at $b$ in its voltage-current characteristic (FIG. 1) than the diode 38. The reasons for this will be given later. The output of the non-linear element 68 is applied through an amplifier 70 as the second input to phase detector 62.

The circuit of FIG. 3 operates as follows. It may be assumed during this discussion that the low voltage state of the negative resistance diode represents the binary digit zero and the high voltage state the binary digit one. The direct-current source connected to terminal 54 forward biases the diode as indicated by load line 20 in FIG. 1. Assume that the diode is initially in its low voltage state as indicated by point 22. If forward bias pulses 46 and 48 are concurrently applied to the diode from sources 30 and 40, the diode switches to its high voltage state 24. Because of the low internal resistance of the diode, these applied pulses approximate constant current pulses. Their amplitudes are such that one pulse is insufficient to drive the load line 20 (representing now the load line for diode 38) past point $b$ in the curve but concurrent pulses are sufficient to do so. In a similar manner, when sources 30 and 40 apply reverse bias pulses concurrently to the diode, the diode either remains in its low voltage state if there initially or switches to its low voltage state if initially in its high voltage state.

Figures 5, 6:
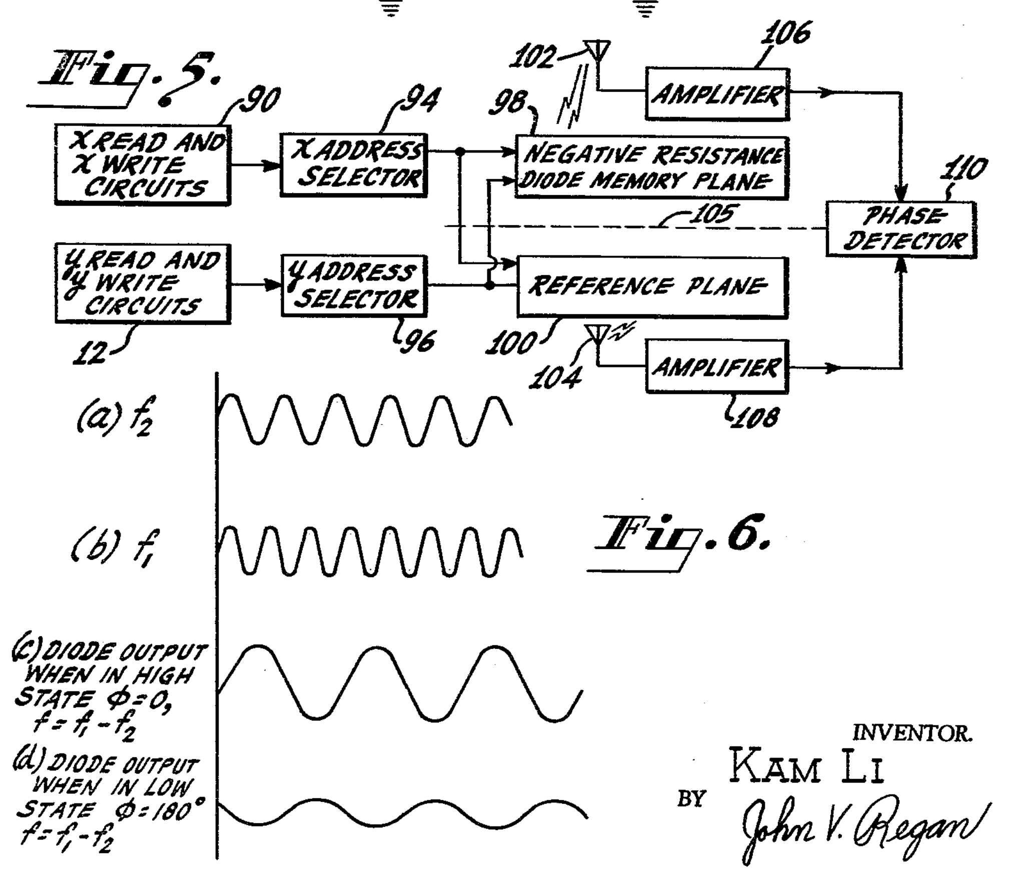
FIG. 5 is a block circuit diagram of a memory according to the invention.
FIG. 6 is a drawing of waveforms to explain the operation of the invention.

Read-out is accomplished by R.F. pulse sources 50 and 52. These apply R.F. pulses (short bursts of R.F. signals) at frequencies $f_1$ and $f_2$ and higher frequencies. For the purposes of the present discussion, it may be assumed that the frequency $f_1-f_2$ is the one of interest. When the diode is in its low voltage state, the beat frequency signal generated is of substantially lower amplitude than when the diode is in its high voltage state. This is because the curve is more non-linear about the point 24 representing the condition of the diode in its high voltage state than it is about the point 22 representing the condition of the diode in its low voltage state. It is also observed that when the diode is in its low voltage state, the phase of the beat frequency signal generated is 180° different than the phase of the beat frequency signal generated when the diode is in its high voltage state. This is shown graphically in FIG. 6. FIGS. 6$a$ and $b$ show the driving signals at frequencies $f_1$ and $f_2$, respectively. FIGS. 6$c$ and $d$ illustrate the beat frequencies generated when the diode is in its high and low voltage states, respectively.

The total amplitude of the signals at frequencies $f_1$ and $f_2$ is such that the diode remains in its stable operating region (either positive resistance regions $ab$ or positive resistance region $cd$) during the read or interrogation interval. This is shown graphically in FIG. 1 by the dashed lines 72 and 74 which represent the extent of the total radio-frequency alternating current generation.

The reason that the phase of the beat frequency signal generated is different when the diode is in its low state than when it is in its high state need not be discussed here. It is sufficient to say that this difference in phase has been observed empirically and, moreover, it can be proved mathematically that this difference should exist.

The beat frequency generated by the negative resistance diode 38 is applied through amplifier 60 to a phase detector 62. The pulses at frequencies $f_1$ and $f_2$ are also applied to a non-linear element 68 as already described to obtain a beat frequency signal at output lead 76 at a reference phase. The beat frequency signal is applied through amplifier 70 to phase detector 62. The two amplifiers 70 and 60 preferably produce output signals of substantially equal amplitude. This prevents differences in amplitudes of signals from diode 38 and element 68 from affecting the phase difference measurements at the phase detector 62. The phase detector produces a direct-current output having one value when its two inputs are in phase and another value when its two inputs are 180° out of phase.

It is mentioned above that if the non-linear element 68 is a negative resistance diode, it should either be biased differently than diode 38 or have a different operating range. For example, the negative resistance diode represented by block 68 may be of the same type as represented by the characteristic of FIG. 1 and it may be biased at a value of about 50 milliamperes. When so biased, the diode will be in its high voltage state and coincident reverse bias read pulses from sources 30 and 40 will not cause the diode to switch so that the phase of the beat frequency obtained from the diode of block 68 will always remain at the same reference value. The same effect may be achieved by using a negative resistance diode biased to the same D.C. lever and in the low state, but having a much higher value of $b$. In this case, coincident forward bias pulses would be insufficient to switch the diode to its high voltage state.

A practical circuit such as shown in FIG. 3 may have the following circuit parameters:

| | | |
|---|---|---|
| Resistors 34 and 44 | ohms | 100 |
| Resistor 56 | do | 200 |
| Resistor 58 | do | 100 |
| Current through resistor 56 | milliamperes | 30 |
| Peak-to-peak amplitude of each radio-frequency pulse | volts | 1 |

Figure 4:
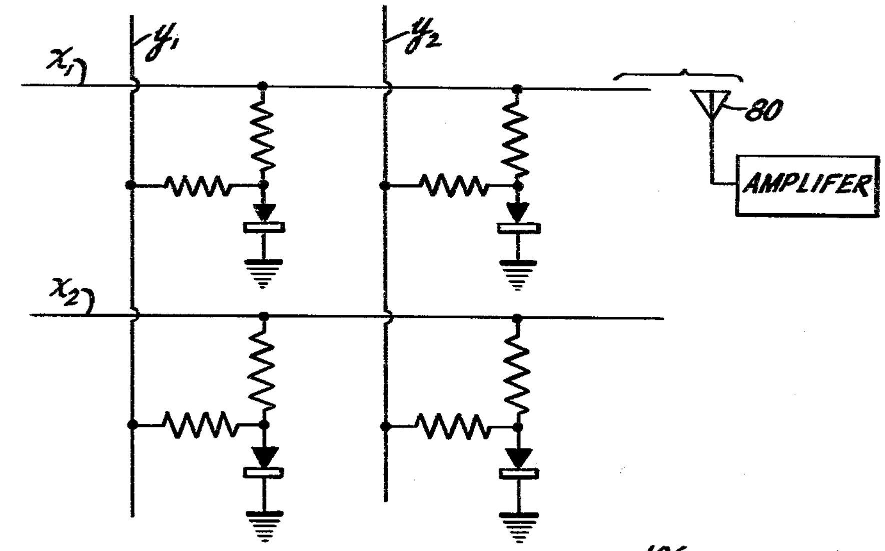
FIG. 4 is a block and schematic circuit diagram of a memory plane according to the present invention.

A memory system using a single memory matrix or memory plane is illustrated in FIG. 4. Although there are only two $x$ buses and 2 $y$ buses shown, it will be appreciated that there may be many more of each, that there may be many more than four memory elements, and that there may be many more memory planes than shown. The $x$ and $y$ read and write sources (not shown in FIG. 4) may be of the type illustrated in FIG. 3. For example, a selected $x$ bus, say $x_1$ may be connected by a suitable switching system to bus 32 of FIG. 3 and a selected $y$ bus, $y_1$, may be connected by a suitable switching system to bus 42 of FIG. 1, and similar circuits may be provided for other buses. The D.C. source and resistor 56 for steady state biasing the diodes is not shown in FIG. 4. It may be like the one shown in FIG. 3 in which case a resistor is employed for each diode or, alternatively, the D.C. bias can be applied through $x$ or $y$ buses, if desired. Read-out from the memory plane can be via a direct connection to the diodes as shown in FIG. 3 or by means of an antenna 80 such as shown in FIG. 4.

For frequencies below, for example, about 100 megacycles, the physical dimensions of the memory plane are small compared to the wavelength. There is then no appreciable relative phase shift among the units. In other words, the different lengths of wire travelled by the signals at frequencies $f_1$ and $f_2$ to the different diode memory elements does not appreciably affect the relative phases of the beat frequency signals developed at the diodes. However, when the read signal frequencies are greater than several hundred megacycles, the lengths of the leads should be taken into account. An arrangement in which this is done is shown in FIG. 5. The $x$ read and write circuits of block 90 and the $y$ read and write circuits of block 92 are similar to those already described in detail in connection with FIG. 3. Only one set of write circuits and one set of read circuits are required for a memory plane. The $x$ address selector and $y$ address selector blocks 94 and 96 respectively represent switches for routing the $x$ and $y$ write and read pulses to a desired diode in the memory plane. Such selectors are known in the computer art. Negative resistance diode memory plane 98 may be one such as is shown in FIG. 4. The reference plane 100 includes non-linear elements. These may be conventional diodes or negative resistance diodes like those discussed in connection with block 68 of FIG. 3. There are the same number of non-linear elements in plane 100 as there are negative resistance diodes in plane 98 and the diodes in plane 100 are positioned and connected similarly to the diodes in plane 98. Accordingly, the distance traversed by signals at frequencies $f_1$ and $f_2$ will be substantially the same in both planes 98 and 100 and their relative phases as they arrive at the negative resistance diode and non-linear reference element, respectively, will be substantially the same. Therefore, the reference beat frequency generated in plane 100 will be compensated and will introduce no errors when the final comparison is made between the phase of this reference signal and the phase of the beat frequency generated in the memory plane.

The read-out from the diode memory plane and the reference plane is by means of antennas 102 and 104, respectively. The antennas are both similarly positioned with respect to their planes. Preferably, some shielding is employed between memory plane 98 and reference plane 100 so that the radiated signal from one goes to the antenna associated with it and not to the antenna associated with the other plane. Such shielding is indicated schematically at 105. The beat frequency signals received at antennas 102 and 104, respectively, are amplified in stages 106 and 108 in a manner already described in connection with FIG. 3. The amplified signals are applied to a phase detector 110 which is also similar to the analogous phase detector of FIG. 3. The output of the phase detector consists of a D.C. pulse or no D.C. pulse depending upon whether the inputs are in phase or 180° out of phase.

It has been previously proposed that information could be read-out of a magnetic core by applying signals at two different frequencies and determining the phase of the beat frequency which results. See, for example, an article by Widrow in the IRE Transactions on Electronic Computers, December 1954, page 12. However, the speed of the read-out with magnetic cores is limited. The read frequencies discussed are of the order of 5 to 7 megacycles and the beat frequency is 1.4 megacycles. The system of the present invention is capable of much, much higher speeds. For example, the read frequencies may be upwards of several thousand megacycles and the beat frequency of the order of several hundred megacycles.

What is claimed is:

1. In a memory system, a memory plane comprising a plurality of memory elements; a plurality of $x$ leads; a like plurality of $y$ leads, each memory element being coupled to one $x$ lead and one $y$ lead and all elements being coupled to a different pair of said leads; a reference plane including the same number of reference elements as said memory elements and positioned in the reference plane at places corresponding to the positions of the memory elements; a second plurality of $x$ leads; a second plurality of $y$ leads; each reference element being coupled to one $x$ lead and one $y$ lead of said second pluralities and all said reference elements having couplings to said leads corresponding to the couplings of the memory elements to the $x$ and $y$ leads of the memory plane, said memory elements being capable of being switched from one condition to another by a coincident current write pulses and said reference elements not being capable of being switched by the same pulses; means for applying read pulses through one $x$ and one $y$ lead, respectively, for the memory plane to a selected memory element and through corresponding $x$ and $y$ leads for the reference plane to a corresponding reference element; and means for comparing the outputs produced by said selected memory element and the corresponding reference element.

2. In a memory system, a memory plane comprising a plurality of negative resistance diodes; a plurality of $x$ leads; a like plurality of $y$ leads, each diode being connected to one $x$ lead and one $y$ lead and all diodes being connected to different pairs of said leads; a reference plane including the same number of non-linear elements as said negative resistance diodes and positioned in the reference plane at places corresponding to the positions of the diode; a second plurality of $x$ leads; a second plurality of $y$ leads; each non-linear element being connected to one $x$ lead and one $y$ lead and all said elements having connections to said leads corresponding to the connections of the negative resistance diodes in the memory plane, said diodes being capable of being switched from one stable state to another by coincident current pulses and said no-linear elements not being capable of being switched by the same pulses; means for applying pulses at frequencies $f_1$ and $f_2$ through one $x$ and one $y$ lead respectively in the memory plane to a selected diode and through corresponding $x$ and $y$ leads in the reference plane to a corresponding non-linear element, whereby the diode and the non-linear element each generate a beat frequency signal; and means for comparing the phase of said beat frequency signals.

3. In a memory system as set forth in claim 2, said last-named means including an antenna for the memory plane and a like antenna for the reference plane, said two antennas being similarly positoned with respect to their planes; amplifier means connected to each of the antennas; and a phase detector for receiving the outputs of said two amplifier means.

4. In a memory system as set forth in claim 2, said non-linear elements comprising negative resistance diodes.

5. In a memory system as set forth in claim 2, said non-linear elements comprising conventional diodes.

References Cited in the file of this patent

UNITED STATES PATENTS

| | | |
|---|---|---|
| 2,692,947 | Spencer | Oct. 26, 1954 |
| 2,815,488 | Neumann | Dec. 3, 1957 |
| 2,845,611 | Williams | July 28, 1958 |
| 2,886,797 | Gardberg | May 12, 1959 |
| 2,958,074 | Kilburn | Oct. 25, 1960 |
| 2,975,377 | Price | Mar. 14, 1961 |

OTHER REFERENCES

A Radio Frequency Nondestructive Readout for Magnetic Cores Memories, by B. Widrow, IRE Transactions on Electronics Computers, December 1954, pages 12–15.